Jan. 16, 1962    E. H. HARTEL    3,017,143
AIRCRAFT LANDING GEAR
Filed Dec. 24, 1958    2 Sheets-Sheet 1

INVENTOR.
ERWIN H. HARTEL
BY
ATTORNEY

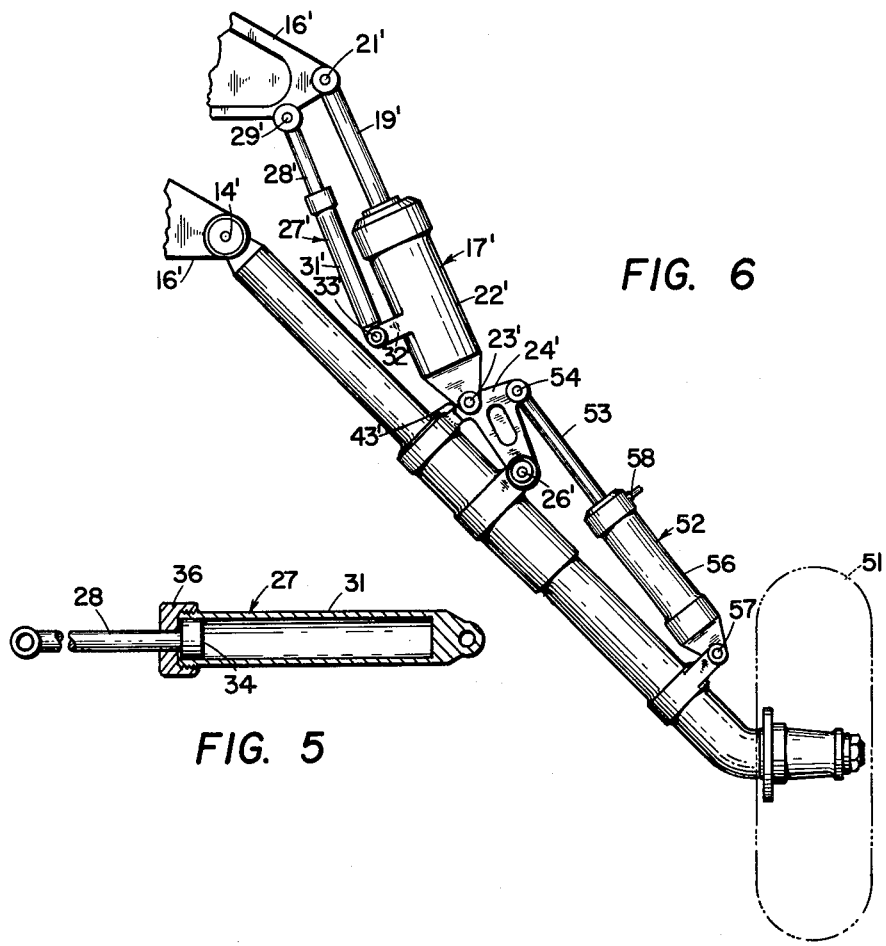

3,017,143
AIRCRAFT LANDING GEAR
Erwin H. Hartel, Brooklyn, Ohio, assignor to Cleveland Pneumatic Industries, Inc., Cleveland, Ohio, a corporation of Ohio
Filed Dec. 24, 1958, Ser. No. 782,863
11 Claims. (Cl. 244—102)

This invention relates generally to landing gears and more particularly to a new and improved retractable landing gear and shock absorbing spring combination.

It is an important object of this invention to provide a restactable landing gear and shock absorbing spring combination wherein the spring operates to move the landing gear from the retracted to the extended position.

It is another important object of this invention to provide a landing gear wherein retraction of the gear partially compresses the landing gear shock absorbing spring so that extension of the landing gear from the retracted position is automaticaly accomplished by extension of the spring.

It is still another object of this invention to provide an articulated landing gear in combination with a shock absorbing spring connected so that the landing gear can be retracted without substantial compression of the spring.

It is still another object of this invention to provide a positive extension of the landing gear without the use of power operated actuators or the like to provide a fail-safe landing gear system.

Further objects and advantages will appear from the following description and drawings, wherein:

FIGURE 5 is an enlarged longitudinal section of the tension assembly;

FIGURE 6 is a side elevation of a second embodiment of the invention wherein power means are provided to retract the landing gear; and FIGURE 7 is a view similar to FIGURE 6 showing the position the second embodiment elements assume in the retracted position.

In the first embodiment of this invention, shown in FIGURES 1 through 5, the landing gear is adapted to be installed on a missile-type aircraft which is launched from a launching mechanism and which lands vertically with a parachute; therefore, pads are provided for the engagement of the ground rather than wheels. In this embodiment, the landing gear is manually moved to the retracted position prior to launching and the uplock, which secures the landing gear in the retracted position, merely releases the landing gear for movement to the extended position prior to landing. Therefore, it is not necessary to provide a power actuator mechanism to operate the landing gear.

Figure 1:
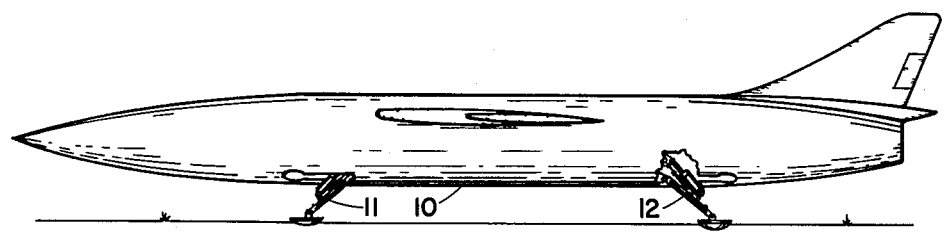
FIGURE 1 is a schematic illustration of a missile-type aircraft with a landing gear according to this invention installed thereon.

In FIGURE 1, a representative type missile aircraft 10 is shown on which is mounted four similar landing gears with a forward pair 11 ahead of the center of gravity and a rearward pair 12 behind the center of gravity. Each of the landing gears is similar so only one will be described in detail with the understanding that this description applies equally to the remaining gears.

Figures 2, 4:
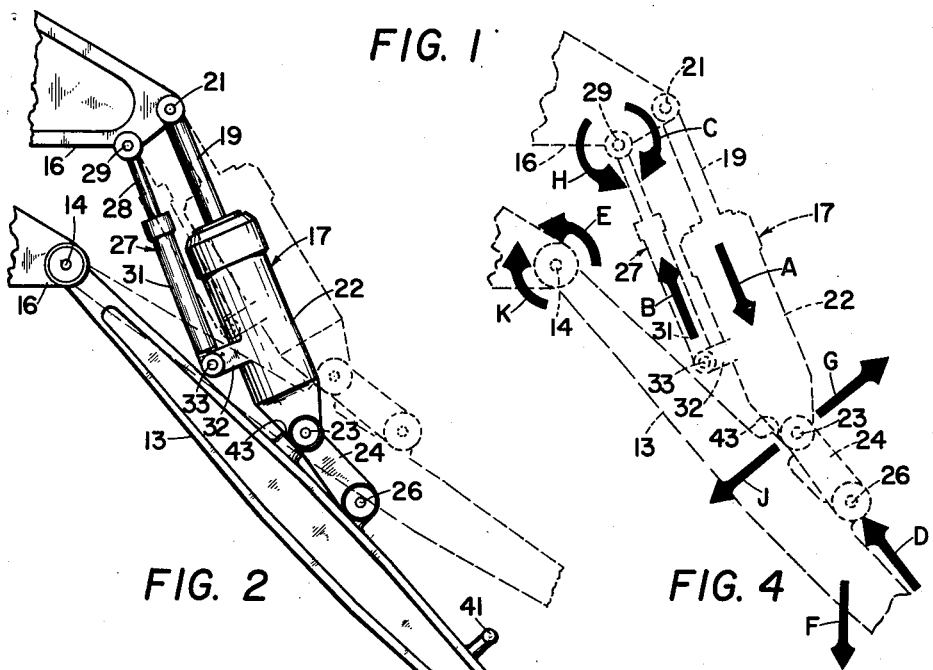
FIGURE 2 is a side elevation of a landing gear incorporating this invention illustrating the position the elements assume in the extended position.
FIGURE 4 is a force diagram illustrating the operation of the landing gear as it moves to the extended position.
Figure 3:
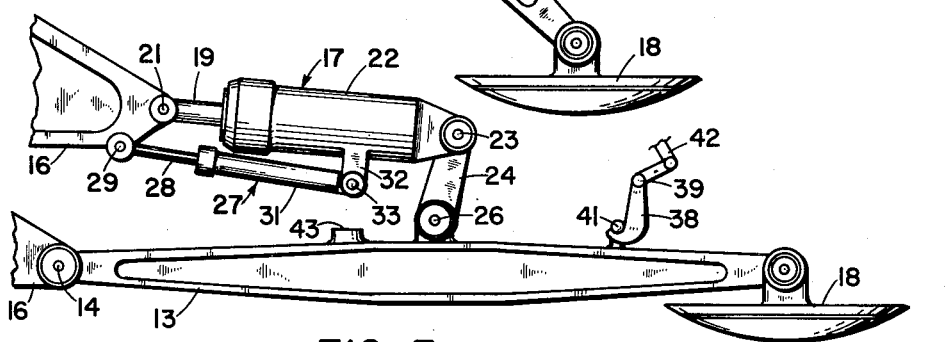
FIGURE 3 is a view similar to FIGURE 2 showing the positions the elements assume when the landing gear is retracted.

Referring to FIGURES 2 and 3, the landing gear includes a strut 13 pivoted at 14 to the aircraft frame 16 for movement between an extended position shown in FIGURE 2 and the retracted position shown in FIGURE 3. A ground engaging pad 18 is pivotally mounted on the lower end of the strut 13 and is adapted to engage the ground during the vertical parachute landing. A fluid spring 17 is connected between the aircraft frame 16 and the strut 13 and operates to resiliently urge the strut 13 toward the extended position of FIGURE 2 so that the landing gear resiliently supports the load of the aircraft when it is on the ground. The fluid spring 17 includes a piston 19 connected by a pivot 21 to the aircraft frame 16 and a cylinder 22 connected by a pivot 23 to a floating link 24. The floating link 24 is in turn connected by a pivot 26 to the strut 13. Preferably, the fluid spring 17 is a liquid spring of the type disclosed in the U.S. Patent No. 2,333,095, dated November 2, 1943. In such a spring, a fluid cavity defined by the piston 19 and cylinder 22 is completely filled with liquid. This liquid is compressed by movement of the piston 19 into the cylinder 22 so that a spring force is developed urging the piston 19 in a direction out of the cylinder 22. Connected between the aircraft frame 16 and the cylinder 22 is a tension assembly 27 which includes a rod 28 connected by a pivot 29 to the frame 16 and a tubular body 31 connected to a lateral lug 32 on the cylinder 22 by a pivot 33.

As shown in FIGURE 5, the rod 28 is provided with a head 34 positioned within the tubular body 31 and engageable with an apertured nut 36 to limit movement of the rod 28 to the left relative to the tubular body 31 beyond the position shown in FIGURE 5. The rod 28 is freely movable to the right from this position so the tension assembly 27 operates to prevent movement of the pivot 33 away from the pivot 29 beyond the distance shown in the full-line position of FIGURE 2 and the position of FIGURE 3 while permitting movement of the pivot 33 toward the pivot 29 under the load supporting condition shown by the phantom position of FIGURE 2.

Referring again to FIGURE 3, the landing gear is maintained in the retracted position by a hook latch 38 connected by a pivot 39 to the aircraft frame which engages an uplock projection 41 on the strut 13. In order to release the landing gear so that it will move to the extended position, any suitable power means schematically illustrated at 42 operates to rotate the hook latch 38 in the counterclockwise direction to release the projection 41. In the fully extended position, the end of the floating link 24 engages a stop 43 formed on the strut 13 and the pivot 23 is below a line connecting the pivots 26 and 21. The extension force produced by the spring maintains this engagement. The spring 17 and the link 24 co-operate to form a foldable toggle which is locked in the overcenter position by engagement between the link 24 and the stop 43 when the landing gear is extended. Therefore, when the pad 18 is urged upward relative to the aircraft frame 16 by engagement with the ground, the stop 43 provides its toggle locking function and the fluid spring 17 is compressed (shown by the phantom position of FIGURE 2), resiliently supporting the aircraft.

The proportions of the tension assembly 27 and the fluid spring 17 are arranged so that when the elements are in the retracted position shown in FIGURE 3, the tension assembly 27 operates to partially compress the fluid spring 17; therefore, a force is developed urging the cylinder 22 to the right. This develops a force moment around the pivot 29 which is a function of the spring force times the perpendicular distance between the axis of the fluid spring 17 and the pivot 29. This clockwise moment assists the weight of the entire landing gear assembly in rotating the landing gear to the extended position shown in FIGURE 2.

During the extension of the landing gear from the retracted position of FIGURE 3, the action of the fluid spring 17 operates to move the floating link 24 overcenter into engagement with the stop 43 as is illustrated by the force diagram of FIGURE 4. The spring force is represented by the arrow A which operates to urge the cylinder 22 downwardly relative to the aircraft frame 16. Because the tension assembly 27 cannot extend beyond the position shown, the tension assembly 27 is placed in tension and applies a force on the pivot 33, illustrated by the force arrow B. The forces A and B operate to produce a clockwise moment C around the pivot 29 which is transmitted through the floating link 24 and moves the strut 13 to the extended position. Just before the floating link 24 engages the stop 43, the pivot 23 is directly in line with the pivots 21 and 26 so at this point, the strut 13 is at a maximum travel in its clockwise rotation. The force C continues to rotate the pivot 23 until the floating link 24 engages the stop 43. This places the floating link 24 in tension and produces a force on the pivot 26 indicated by the force arrow D. The force D in turn produces a counterclockwise rotation moment E about the pivot 14 which overcomes the moment developed by the mass of the system indicated by the arrow F to move the strut 13 back in a counterclockwise direction until the floating link 24 engages the stop 43. The engagement of the stop 43 with the floating link 24 produces a force reaction G on the fluid spring 17 which in turn develops a counterclockwise moment H around the pivot 29 which neutralizes the clockwise moment C. This engagement also produces a force reaction indicated by the arrow J on the strut 13 which operates to develop a clockwise moment K which neutralizes the counterclockwise moment E. Therefore, the force A of the spring 17 operates to move the floating link 24 overcenter into engagement with the stop 43 and maintain it in engagement until the impact of the pad 18 with the ground.

In order to retract the landing gear, it is merely necessary to manually move the floating link 24 in a clockwise direction overcenter and then move the strut 13 in a counterclockwise direction until the elements reach the retracted position of FIGURE 3 wherein they are locked by the uplock assembly. The various proportions are arranged so that the floating link 24 rotates in a clockwise direction and the fluid spring 17 is only partially compressed during retraction so that excessive forces are not necessary to retract the landing gear. It is necessary to arrange the proportions so that the fluid spring 17 is compressed sufficiently to provide enough energy to insure full extension of the landing gear. The spring 17 and floating link 24 therefore operate as an overcenter locked toggle when the landing gear provides its support function and folds during retraction so the spring is only partially compressed. Because the fluid spring 17 provides the necessary force to insure full extension of the landing gear, it is not necessary to use power extension actuators and a very simple landing gear is provided.

If a landing gear, according to this invention, is used on a normal aircraft, power retraction is necessary and the embodiment shown in FIGURES 6 and 7 is utilized. Elements which are common to both embodiments and serve the same functions are indicated by the same reference numeral as in the first embodiment with a prime (') added.

The second embodiment landing gear includes a strut 13' pivoted at 14' to the aircraft frame 16'. A fluid spring 17' is pivoted at 21' to the aircraft frame 16' and at 23' to the floating link 24'. A tension assembly 27' is connected between the fluid spring 17' and the aircraft frame 16'. In this embodiment, a conventional landing wheel 51 is journalled on the lower end of the strut 13'. In order to provide retraction of the landing gear after a conventional takeoff, a hydraulic actuator 52 of the piston and cylinder type is provided. The piston 53 is connected by a pivot 54 to the floating link 24' and the cylinder 56 is connected by a pivot 57 to a lateral projection on the strut 13'. When the landing gear is in the fully extended position, the floating link 24' engages the stop 43' and the landing gear functions in the same manner described in connection with the first embodiment. However, when retraction of the landing gear is required, fluid under pressure is supplied through a pressure line 58 which causes the piston 53 to move into the cylinder 56 and rotate the floating link 24' in a clockwise direction around its pivot 26'. The rotation of the floating link 24' in co-operation with the tension assembly 27' causes the strut 13' to move to the fully retracted position as shown in FIGURE 7. A suitable uplock, of the type shown in the first embodiment, can be used to maintain the landing gear in the retracted position. When it is necessary to extend the landing gear, the uplock is released while the pressure line 58 is connected to the reservoir return. The release of the uplock can be manual so extension of the landing gear is completely independent of power actuation. The fluid spring 17' operates to move the landing gear to the extended position in the same manner described above in connection with the first embodiment; therefore, it is not necesary for the actuator 52 to be double-acting. This structure provides maximum safety since the landing gear will move to the fully extended position without the assistance of power actuation. Therefore, failure of the hydraulic system of the aircraft will not prevent the full extension of the landing gear.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A landing gear comprising a frame, a strut journalled on said frame for movement between extended and retracted positions, a toggle linkage connected between said frame and strut including a fluid extension spring adapted to resiliently support a load on the landing gear, said linkage being adapted to fold during movement of said strut to said retracted position, said linkage being adapted to move from said folded position to an overcenter position by operation of the fluid extension spring during the extension of the strut, and means engageable by said linkage limiting movement of said linkage beyond a predetermined overcenter position, said strut moving from said extended position toward said retracted position under the influence of said load applied to said landing gear while said link is in said overcenter position engaging said means thereby compressing said resilient spring to resiliently support said load.

2. A landing gear comprising a frame, a strut journalled on said frame for movement between extended and retracted positions, a fluid extension spring including a pair of telescoping members adapted to resiliently support a load on the landing gear, a first pivotal connection between one of said members and said frame, a link between the other of said members and said strut, a second pivotal connection between said link and strut, a third pivotal connection between said link and said other member, said third pivotal connection moving on one side of a line passing through said first and second connections during movement of said strut to said retracted position, said third connection moving to the other side of said line during movement of said strut by operation of the fluid extension spring to said extended position, said strut moving from said extended position toward said retracted position under the influence of said load applied to said landing gear while said third connection is in engagement with said means thereby compressing said resilient spring to resiliently support said load, and means on said strut limiting movement of said third connection beyond a predetermined position on said last side of said line.

3. A landing gear comprising a frame, a strut journalled on said frame for movement between extended and retracted positions, a toggle linkage connected between said frame and strut including a fluid extension spring adapted to resiliently support a load on the landing gear, said linkage being adapted to fold during movement of said strut to said retracted position, said linkage being adapted to move from said folded position to an overcenter position by operation of the fluid extension spring during the extension of the strut, means on said strut limiting movement of said linkage beyond a predetermined overcenter position, said strut moving from said extended position toward said retracted position under the influence of said load applied to said landing gear while said link is in said overcenter position against said means thereby compressing said resilient spring to resiliently support said load, and power means connected to said linkage operable to move it to said folded position.

4. A landing gear comprising a strut journalled on a frame for movement between extended and retracted positions, a fluid extension spring including a pair of telescoping members adapted to resiliently support a load on the landing gear, means connecting one of said members to said frame and the other of said members to said strut, said means including an overcenter toggle link positioned against a stop by said fluid extension spring when said strut is in said extended position and movable to a folded position spaced from said stop when said strut is in said retracted position, and tension means operable to transmit only tension forces connected to said other member and to said frame, said link moving to said folded position upon movement of said strut to said retracted position and partially compressing said spring, said strut moving from said extended position toward said retracted position under the influence of a load applied to said landing gear while said link is in engagement with said stop thereby compressing said fluid spring to resiliently support said load.

5. A landing gear comprising a strut journalled on a frame for movement between extended and retracted positions, a fluid extension spring adapted to resiliently support a load on the landing gear including a pair of telescoping members, means connecting one of said members to said frame and the other of said members to said strut, said means including an overcenter toggle link positioned against a stop by said fluid extension spring when said strut is in said extended position and movable to a folded position spaced from said stop when said strut is in said retracted position, said strut moving from said extended position toward said retracted position under the influence of said load applied to said landing gear while said link is in engagement with said stop thereby compressing said fluid spring to resiliently support said load, tension means operable to transmit only tension forces connected to said other member and to said frame at a point spaced from the connection between said first member and frame, movement of said link to said folded position moving said strut to said retracted position with partial compression of said spring, and power means connected to said link operable to move said link to said folded position.

6. A landing gear comprising a strut journalled on a frame for movement between extended and retracted positions, a fluid extension spring adapted to resiliently support a load on the landing gear including a pair of telescoping members, a pivot connecting one of said members to said frame, a link connected between the other of said members and said strut, a stop on said strut engaged by said link maintaining said link substantially in alignment with said spring when said strut is in said extended position by operation of said fluid extension spring, said strut moving from said extended position toward said retracted position under the influence of said load applied to said landing gear while said link is in engagement with said stop thereby compressing said fluid spring to resiliently support said load, and tension means operable to transmit only tension forces connected to said other member and to said frame at a point spaced from the connection between said first member and frame, said link moving to a folded position when said strut moves to said retracted position partially compressing said spring.

7. A landing gear comprising a strut journalled on a frame for movement between extended and retracted positions, a fluid extension spring adapted to resiliently support a load on the landing gear including a pair of telescoping members, a pivot connecting one of said members to said frame, a link connected between the other of said members and said strut, a stop on said strut engaged by said link when said strut is in said extended position by operation of said fluid extension spring, said strut moving from said extended position toward said retracted position under the influence of said load applied to said landing gear while said link is in engagement with said stop thereby compressing said fluid spring to resiliently support said load, tension means operable to transmit only tension forces connected to said other member and to said frame at a point spaced from the connection between said first member and frame, folding movement of said link to a folded position moving said strut to said retracted position with partial compression of said spring, and power means connected between said link and strut operable to move it to said folded position.

8. A landing gear comprising a strut journalled on a frame for movement between retracted and extended positions, a fluid extension spring adapted to resiliently support a load on the landing gear, a link, a first pivot connecting said spring to said frame, second and third pivots connecting said spring to said link and said link to said strut respectively, tension means connected between said spring and frame limiting extension of said spring, and stop means on said strut engageable with said link preventing movement thereof relative to said strut in one direction beyond a predetermined position, said strut moving from said extended position toward said retracted position under the influence of said load applied to said landing gear while said link is in engagement with said stop thereby compressing said fluid spring to resiliently support said load, the extension force of said spring in co-operation with said tension means urging said link into engagement with said stop, said link moving to a folded position spaced from said stop upon movement of said strut to said retracted position, said tension means partially compressing said spring when said strut is in said retracted position.

9. A landing gear comprising a strut journalled on a frame for movement between retracted and extended positions, a fluid extension spring adapted to resiliently support a load on the landing gear, a link, a first pivot connecting said spring and frame, second and third pivots connecting said spring to said link and said link to said strut respectively, tension means connected between said spring and frame limiting extension of said spring, a stop on said strut engageable with said link preventing movement thereof relative to said strut in one direction beyond a predetermined position substantially aligned with said spring, said strut moving from said extended position toward said retracted position under the influence of said load applied to said landing gear while said link is in engagement with said stop thereby compressing said fluid spring to resiliently support said load, the extension force of said spring in co-operation with said tension means urging said link into engagement with said stop, rotation of said link in a direction away from said stop operating to move said strut to said retracted position and partially compressing said spring, and power means connected between said strut and link operable to rotate said link away from said stop.

10. A landing gear comprising a strut journalled on a frame for movement between retracted and extended positions, a fluid extension spring adapted to resiliently support a load on the landing gear, a link, a first pivot connecting said spring and frame, second and third pivots connecting said spring to said link and said link to said strut respectively, means operable to transmit only tension forces connected to said frame at a point spaced from said second pivot and to said spring limiting extension of said spring, and a stop on said strut engageable with said link preventing movement thereof relative to said strut in one direction beyond a predetermined position on one side of a line connecting said first and third pivots, said strut moving from said extended position toward said retracted position under the influence of said load applied to said landing gear while said link is in engagement with said stop thereby compressing said fluid spring to resiliently support said load, the extension force of said spring in co-operation with said tension spring urging said link into engagement with said stop.

11. A landing gear comprising a strut journalled on a frame for movement between retracted and extended positions, a fluid extension spring adapted to resiliently support a load on the landing gear, a link, a first pivot connecting said spring and frame, second and third pivots connecting said spring to said link and said link to said strut respectively, means operable to transmit only tension forces connected to said frame at a point spaced from said second pivot and to said spring limiting extension of said spring, and a stop on said strut engageable with said link preventing movement thereof relative to said strut in one direction beyond a predetermined position substantially aligned with said spring, the extension force of said spring in co-operation with said tension spring urging said link into engagement with said stop, said strut moving from said extended position toward said retracted position under the influence of said load applied to said landing gear while said link is in engagement with said stop thereby compressing said fluid spring to resiliently support said load, said link rotating in a direction away from said stop to a folded position upon movement of said strut to said retracted position and partially compressing said spring.

References Cited in the file of this patent

UNITED STATES PATENTS

| | | |
|---|---|---|
| 2,461,595 | Foster | Feb. 15, 1949 |
| 2,777,652 | Grudin | Jan. 15, 1957 |
| 2,811,326 | Westcott | Oct. 29, 1957 |

FOREIGN PATENTS

| | | |
|---|---|---|
| 503,789 | Great Britain | Apr. 13, 1949 |